US012282104B2

United States Patent
Umegaki et al.

(10) Patent No.: US 12,282,104 B2
(45) Date of Patent: Apr. 22, 2025

(54) SATELLITE ATTITUDE ESTIMATION SYSTEM AND SATELLITE ATTITUDE ESTIMATION METHOD

(71) Applicant: NEC Corporation, Tokyo (JP)

(72) Inventors: Chika Umegaki, Tokyo (JP); Kenta Senzaki, Tokyo (JP); Katsuya Odaka, Tokyo (JP); Hironobu Mori, Tokyo (JP); Kyoko Murozono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 450 days.

(21) Appl. No.: 17/702,009

(22) Filed: Mar. 23, 2022

(65) Prior Publication Data

US 2022/0317314 A1    Oct. 6, 2022

(30) Foreign Application Priority Data

Apr. 1, 2021    (JP) .................................. 2021-062514

(51) Int. Cl.
*G01S 19/40*    (2010.01)
*G01C 21/02*    (2006.01)
(Continued)

(52) U.S. Cl.
CPC ............ *G01S 19/40* (2013.01); *G01C 21/025* (2013.01); *G01C 21/24* (2013.01); *G01S 19/485* (2020.05)

(58) Field of Classification Search
CPC ..... G01S 19/40; G01S 19/485; G01C 21/025; G01C 21/24
See application file for complete search history.

(56) References Cited

U.S. PATENT DOCUMENTS 5,258,764 A * 11/1993 Malinowski ............. H01Q 3/14
                                                      342/359
6,066,850 A *  5/2000 Hersom ................... B64G 1/366
                                                      250/342
(Continued)

FOREIGN PATENT DOCUMENTS

CN    101858747 A  * 10/2010
CN    106706133 A  *  5/2017 ............ G01J 5/0022
(Continued)

OTHER PUBLICATIONS

Yilmaz et. al. Using infrared based relative navigation for active debris removal., Jun. 2, 2017 (Year: 2017).*
(Continued)

*Primary Examiner* — Vladimir Magloire
*Assistant Examiner* — Bongani Jabulani Mashele

(57)    ABSTRACT

A satellite attitude estimation system includes an infrared sensor configured to capture an infrared image of a target satellite for which an attitude is to be estimated. The system determines, in the captured infrared image, a first pixel having a largest luminance and a second pixel having a smallest luminance in the infrared image. The system associates the first pixels with first coordinates of a 3D structure of the target satellite, and associates the second pixels with second coordinates of the 3D structure of the target satellite. The system computes a first normal vector to a surface of the 3D structure for the first coordinates, and computes a second normal vector to the surface of the 3D structure for the second coordinates. The system estimates a direction of the target satellite to the sun before the infrared image was taken, using the computed first and second normal vectors.

20 Claims, 12 Drawing Sheets

(51) Int. Cl.
*G01C 21/24* (2006.01)
*G01S 19/48* (2010.01)

(56) References Cited

U.S. PATENT DOCUMENTS

| | | | | |
|---|---|---|---|---|
| 2008/0128559 | A1* | 6/2008 | Ho | B64G 1/1021 244/164 |
| 2015/0298827 | A1* | 10/2015 | Nguyen | B64G 1/365 701/13 |
| 2016/0347482 | A1* | 12/2016 | Dimpfl | B64G 3/00 |
| 2017/0250751 | A1* | 8/2017 | Kargieman | G06V 20/176 |
| 2019/0197724 | A1 | 6/2019 | Lee et al. | |
| 2019/0212413 | A1* | 7/2019 | Barnett | G01S 3/7862 |

FOREIGN PATENT DOCUMENTS

| | | | | |
|---|---|---|---|---|
| CN | 108981721 A | * | 12/2018 | G01C 21/02 |
| JP | H06-185984 A | | 7/1994 | |
| JP | 3697433 B2 | | 9/2005 | |
| JP | 6188345 B2 | | 8/2017 | |
| JP | 2019-117630 A | | 7/2019 | |
| JP | 2020-173626 A | | 10/2020 | |

OTHER PUBLICATIONS

Shi et. al. Uncooperative Spacecraft Pose Estimation Using an Infrared Camera During Proximity Operations., Sep. 2, 2015, AIAA Space 2015 Conferences and Exposition (Year: 2015).*
R. Volpe and C. Circi, Optical-aided, autonomous and optimal space rendezvous with a non-cooperative target. 2019, Acta Astronautica 157 (528-540) (Year: 2019).*
Binz et. al. Optical Survey of the Tumble Rates of Retired GEO Satellites. US Naval Research Laboratory (Year: 2016).*
Uncooperative Spacecraft Pose Estimation Using an Infrared Camera During Proximity Operations Jian-Feng Shi, Steve Ulrich, Stephane Ruel and Martin Anctil Session: Space Robotics and Automation—Proximity Operations and On-orbit Servicing (Year: 2015).*
JP Office Action for JP Application No. 2021-062514, mailed on Jan. 7, 2025 with English Translation.
Minoru Mizuno et al., Structural Thermal Model Tests on Exposed Facility of the Japanese Experiment Module for the International Space Station "Alpha", Ishikawajima-Harima engineering review, Ishikawajima-Harima Heavy Industries Co., Ltd., Mar. 24, 1998, vol. 36, No. 1.
Anthea Comellini et al., "Vision-based navigation for autonomous space rendezvous with non-cooperative targets," 2020 11th International Conference on Information, Intelligence, Systems and Applications (IISA), IEEE, Jul. 15, 2020.

* cited by examiner

SATELLITE ATTITUDE ESTIMATION SYSTEM AND SATELLITE ATTITUDE ESTIMATION METHOD

This application is based upon and claims the benefit of priority from Japanese patent application No. 2021-062514, filed on Apr. 1, 2021, the disclosure of which is incorporated here in its entirety by reference.

BACKGROUND

Technical Field

The present invention relates to a satellite attitude estimation system, a satellite attitude estimation method, and a recording medium storing a satellite attitude estimation program, and in particular to a satellite attitude estimation system, a satellite attitude estimation method, and a recording medium storing a satellite attitude estimation program that can estimate the attitude of a target satellite relative to the sun prior to the time when it was taken by an optical camera, etc. based on information on the temperature of the target satellite.

Related Art

In order to understand the status of other satellites from the self-satellite in space, it is required that as much information as possible about other satellites be acquired. In this document, "satellite" means "artificial satellite".

For example, the status of a satellite to be understood is the status of a satellite that has failed and can no longer be monitored and controlled. Space debris, etc. may also be understood.

In order to protect home country satellites from other threatening satellites, there is a need to develop satellites to monitor threatening satellites. In particular, the attitude information of the threatening satellites to be monitored may be an indicator to infer the target being monitored by the threatening satellites and the purpose of the threatening satellites. In other words, acquiring the attitude information of the satellite to be monitored is an important task in the monitoring operation. In the following, the satellite whose the attitude information to be acquired is also called the "target satellite".

For example, a method for estimating the attitude of an object is described in Japanese Patent No. 6188345. Japanese Patent No. 6188345 describes a technique for suppressing the degradation of recognition accuracy regarding the attitude in the vicinity of a specific attitude class when estimating the attitude of a target object in an input image.

Also, Japanese Patent No. 3697433 describes a target identification device that identifies targets such as ships based on Inverse Synthetic Aperture Radar (ISAR) images. Japanese Patent No. 3697433 describes a method for acquiring the attitude of an object from a simulated image in which a 3D model is used.

SUMMARY

Therefore, it is an object of the present invention to provide a satellite attitude estimation system, a satellite attitude estimation method, and a satellite attitude estimation program that can estimate the attitude of a satellite before the satellite was taken from the taken images.

In an example embodiment of the present disclosure, a satellite attitude estimation system includes a determination unit which determines the maximum pixel, which is a pixel with the largest luminance, and the minimum pixel, which is a pixel with the smallest luminance, respectively, in an infrared image, which is an image taken by an infrared sensor of a target satellite that is a satellite whose attitude is to be estimated, an association unit which associates the determined maximum and minimum pixels with coordinates on the 3D structure of the target satellite, respectively, a computation unit which computes normal vectors for a surface including the coordinates associated with the pixel, respectively, over the coordinates associated with each pixel, and a sun direction estimation unit which estimates the direction of the sun relative to the target satellite before the infrared image is taken using the computed normal vectors.

In an example embodiment of the present disclosure, a satellite attitude estimation method includes determining the maximum pixel, which is a pixel with the largest luminance, and the minimum pixel, which is a pixel with the smallest luminance, respectively, in an infrared image, which is an image taken by an infrared sensor of a target satellite that is a satellite whose attitude is to be estimated, associating the determined maximum and minimum pixels with coordinates on the 3D structure of the target satellite, respectively, computing normal vectors for a surface including the coordinates associated with the pixel, respectively, over the coordinates associated with each pixel, and estimating the direction of the sun relative to the target satellite before the infrared image is taken using the computed normal vectors.

In an example embodiment of the present disclosure, a non-transitory computer-readable recording medium recording a satellite attitude estimation program causing a computer to execute a determination process of determining the maximum pixel, which is a pixel with the largest luminance, and the minimum pixel, which is a pixel with the smallest luminance, respectively, in an infrared image, which is an image taken by an infrared sensor of a target satellite that is a satellite whose attitude is to be estimated, an association process of associating the determined maximum and minimum pixels with coordinates on the 3D structure of the target satellite, respectively, a computation process of computing normal vectors for a surface including the coordinates associated with the pixel, respectively, over the coordinates associated with each pixel, and an estimation process of estimating the direction of the sun relative to the target satellite before the infrared image is taken using the computed normal vectors.

DETAILED DESCRIPTION

Figure 1:
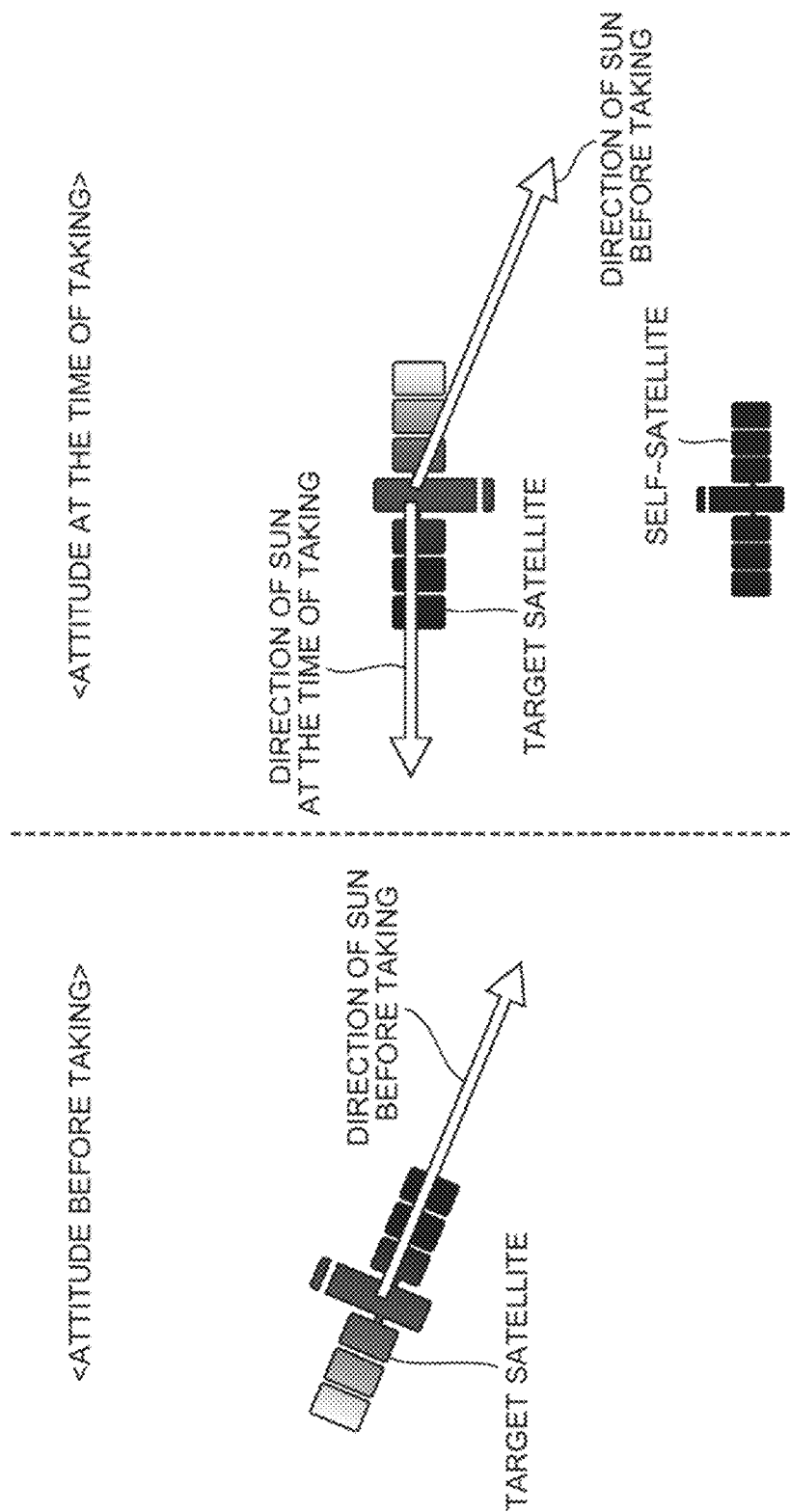
FIG. 1 is an explanatory diagram showing an example of an attitude of a target satellite before and at the time of taking.

First, the outline of the present application will be explained in detail. FIG. 1 is an explanatory diagram showing an example of an attitude of a target satellite before and at the time of taking. In the example shown in FIG. 1, the target satellite is taken from a self-satellite.

As shown in FIG. 1, when the position and attitude of the target satellite before the taking and the position and attitude at the time of the taking are different, the direction of the sun relative to the target satellite at each time point is different. In the present application, the attitude of the target satellite is expressed in terms of parameters such as Euler angles and quaternions.

For example, the housing of the target satellite is warmed by the thermal energy of the sun before it is taken. In other words, the surface in the housing of the target satellite that was facing the sun is considered to be the hottest at the time of the taking. The color of the target satellite shown in FIG. 1 represents the temperature of the housing, which gradually becomes lighter as the temperature decreases. Each of the notations shown in FIG. 1 has the same meaning in the other figures.

If the infrared image that the target satellite was taken is analyzed, the pixel with the largest luminance in the infrared image will be identified. For the above reason, the identified pixel is considered to be correlated with the direction of the sun. Therefore, if the position of the target satellite corresponding to the identified pixel is identified, it is considered that the direction of the sun can be estimated.

As described above, the satellite attitude estimation system of the present application is characterized in that it estimates the orientation of the target satellite with respect to the sun prior to the time of the taking, i.e., the attitude of the target satellite, by taking the target satellite using a measurement device that can acquire information on the temperature of the object, such as a thermal infrared sensor, and acquiring luminance information. The configuration and operation of the satellite attitude estimation system are described in detail below.

Example Embodiment 1

[Description of Configuration]

Figure 2:
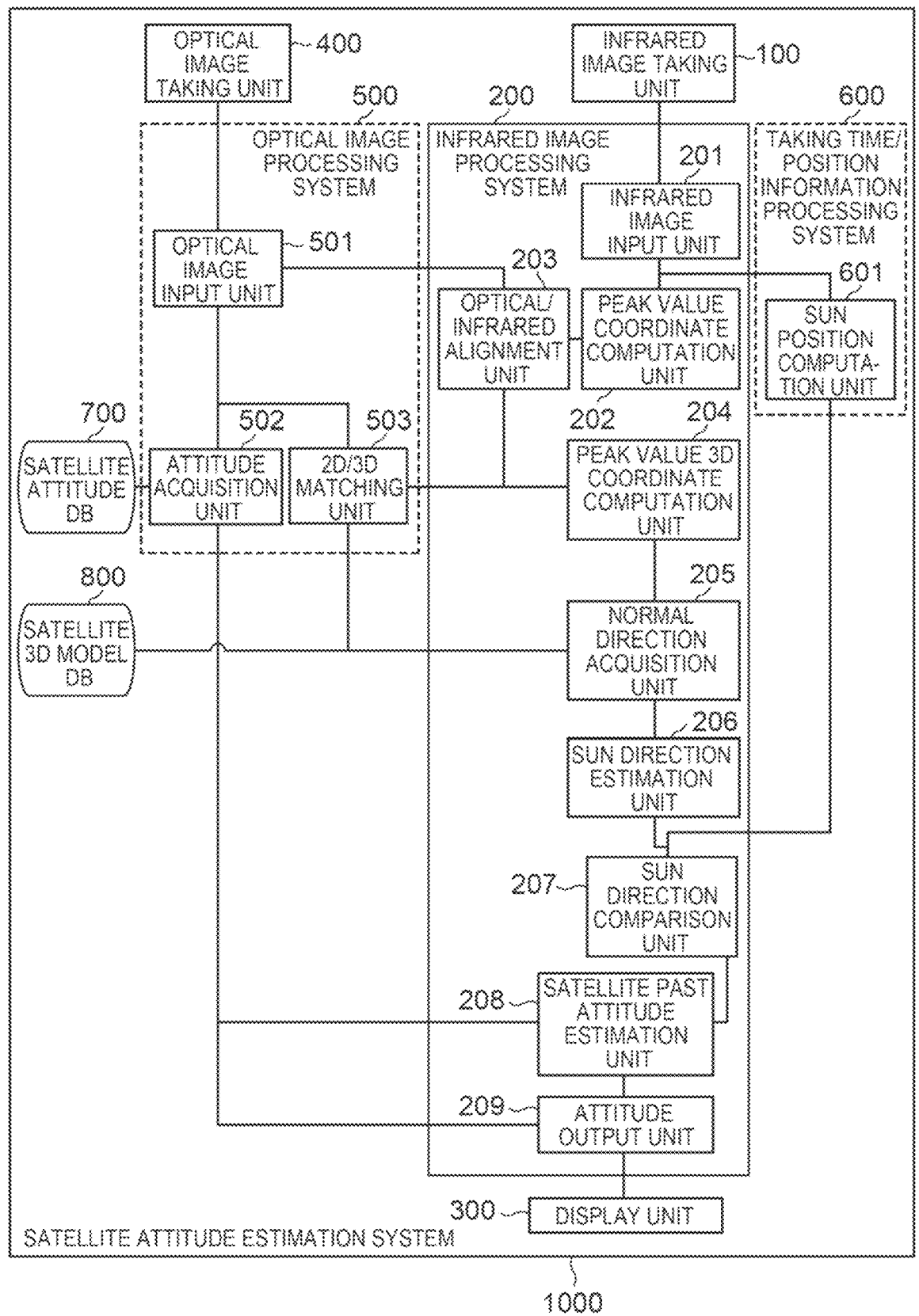
FIG. 2 is a block diagram showing an example of the configuration of a satellite attitude estimation system of the first example embodiment of the present invention.

Hereinafter, a first example embodiment of the present invention will be described with reference to the drawings. FIG. 2 is a block diagram showing an example of the configuration of a satellite attitude estimation system of the first example embodiment of the present invention.

As shown in FIG. 2, the satellite attitude estimation system 1000 includes an infrared image processing system 200, an optical image processing system 500, and an taking time/position information processing system 600.

As shown in FIG. 2, the infrared image processing system 200 is connected to the infrared image taking unit 100 for communication. The infrared image taking unit 100 consists of a sensor device that can acquire temperature information, such as an infrared camera.

As shown in FIG. 2, the infrared image processing system 200 has an infrared image input unit 201, a peak value coordinate computation unit 202, an optical/infrared alignment unit 203, a peak value 3D coordinate computation unit 204, a normal direction acquisition unit 205, a sun direction estimation unit 206, a sun direction comparison unit 207, a satellite past attitude estimation unit 208, and an attitude output unit 209.

As shown in FIG. 2, the optical/infrared alignment unit 203 and the peak value 3D coordinate computation unit 204 are connected to the optical image processing system 500, which is an external system of the infrared image processing system 200, for communication. The optical image processing system 500 has an optical image input unit 501, an attitude acquisition unit 502, and a 2D/3D matching unit 503.

As shown in FIG. 2, an optical image taking unit 400 is connected to the optical image processing system 500, for communication. The optical image taking unit 400 takes the target satellite from almost the same position as the infrared image taking unit 100.

As shown in FIG. 2, the infrared image input unit 201 and the sun direction comparison unit 207 are connected to the taking time/position information processing system 600, which is an external system of the infrared image processing system 200, for communication. The taking time/position information processing system 600 has a sun position computation unit 601.

As shown in FIG. 2, a display unit 300, such as a display, is connected to the infrared image processing system 200, for communication.

As shown in FIG. 2, the optical image processing system 500 is connected to a satellite attitude database 700, which is independent of the system, for communication. The satellite attitude database 700 stores the training images of the target satellite.

The training image in this example embodiment is required to be associated with the attitude information of the target satellite that is taken. Therefore, such as a real image of the target object whose attitude information is known or a computer graphics (CG) image generated using data of a three-dimensional model can be used as the training image. The attitude parameters are associated with the training images stored in the satellite attitude database 700 of this example embodiment.

As shown in FIG. 2, the infrared image processing system 200 and the optical image processing system 500 are connected to a satellite 3D model database 800, for communication. The satellite 3D model database 800 stores simulated images generated based on the 3D model of the target satellite by changing the orientation of the 3D model from a single viewpoint.

The coordinates on the 3D structure of the target satellite which is taken are associated with the simulated image of this example embodiment. The coordinates on the 3D structure represent the coordinates that are fixed to the 3D model.

For example, in a cube with a side length of a (a is a positive real number), if the coordinate of the center of gravity of the cube is the origin, the coordinates on the 3D structure of the vertices of the cube are expressed as (½a, ½a, ½a), etc.

For example, the satellite attitude database 700 and the satellite 3D model database 800 are realized in a storage device such as RAM (Random Access Memory).

The specific processing by each component of the satellite attitude estimation system 1000 of this example embodiment is described below. First, the infrared image taking unit 100 records the infrared image data of the target satellite using a sensor device such as an infrared camera. Next, the infrared image taking unit 100 inputs the recorded infrared image data of the target satellite to the infrared image processing system 200.

Next, the infrared image data from the infrared image taking unit 100 is input to the infrared image input unit 201. The infrared image input unit 201 inputs the infrared image indicated by the infrared image data to the peak value coordinate computation unit 202 and the taking time information indicated by the infrared image data to the sun position computation unit 601, respectively.

The peak value coordinate computation unit 202 computes the coordinates of the pixel with the largest luminance and the pixel with the smallest luminance, respectively, in the input infrared image.

In other words, the peak value coordinate computation unit 202 determines the maximum pixel, which is a pixel with the largest luminance, and the minimum pixel, which is a pixel with the smallest luminance, respectively, in an infrared image, which is an image taken by an infrared sensor of a target satellite that is a satellite whose attitude is to be estimated.

The sun position computation unit 601 computes the position of the target satellite $(X_t, Y_t, Z_t)$ and the position of the sun $(X_s, Y_s, Z_s)$ in a predetermined fixed coordinate system based on the taking time information input from the infrared image input unit 201, respectively.

Next, the sun position computation unit 601 computes the unit vector $Vec_{now}=(X_s-X_t, Y_s-Y_t, Z_s-Z_t)$ of the direction of the sun starting from the target satellite. The direction of the sun indicated by the computed $Vec_{now}$ corresponds to the direction of the sun at the time of the taking shown in FIG. 1. The sun position computation unit 601 inputs the information indicating the computed unit vector $Vec_{now}$ of the direction of the sun at the time of the taking to the sun direction comparison unit 207.

At the same time that the infrared image taking unit 100 records the infrared image data of the target satellite, the optical image taking unit 400 also records the optical image data of the target satellite. The optical image taking unit 400 inputs the recorded optical image data to the optical image input unit 501. Next, the optical image input unit 501 inputs the recorded optical image data to the optical/infrared alignment unit 203, the attitude acquisition unit 502, and the 2D/3D matching unit 503.

The attitude acquisition unit 502 refers to the satellite attitude database 700 based on the input optical image data. Next, the attitude acquisition unit 502 matches the optical image indicated by the optical image data with the training image stored in the satellite attitude database 700, respectively, and searches for the training image that is most similar to the optical image.

Next, the attitude acquisition unit 502 determines the attitude parameters associated with the searched training image as the attitude information of the optical image. The attitude acquisition unit 502 inputs the determined attitude information to the satellite past attitude estimation unit 208 and the attitude output unit 209.

The 2D/3D matching unit 503 receives the optical image data of the target satellite input from the optical image input unit 501. The 2D/3D matching unit 503 associates the 3D structure of the target satellite with the 2D optical image based on the optical image of the target satellite indicated by the optical image data input from the optical image input unit 501.

The 2D/3D matching unit 503 of this example embodiment acquires the 3D structure of the target satellite based on the received optical image by using a simulation method with a 3D model. It is assumed that the 3D model of the target satellite is known.

Specifically, the 2D/3D matching unit 503 matches the received optical image with the simulated image stored in the satellite 3D model database 800, respectively, and searches for the simulated image that is most similar to the optical image.

Next, the 2D/3D matching unit 503 associates the coordinates on the 3D structure associated with the searched simulated image with the optical image. The 2D/3D matching unit 503 may associate the optical image with the information of the coordinates on the 3D structure of the target satellite using the method described in Japanese Patent No. 3697433 or other general object attitude acquisition methods.

The 2D/3D matching unit 503 inputs the information of the coordinates on the 3D structure associated with the optical image to the peak value 3D coordinate computation unit 204.

The optical/infrared alignment unit 203 performs alignment based on the coordinates of the pixel with the largest luminance and the coordinates of the pixel with the smallest luminance in the infrared image input from the peak value coordinate computation unit 202, and the optical image data input from the optical image input unit 501.

Figure 3:
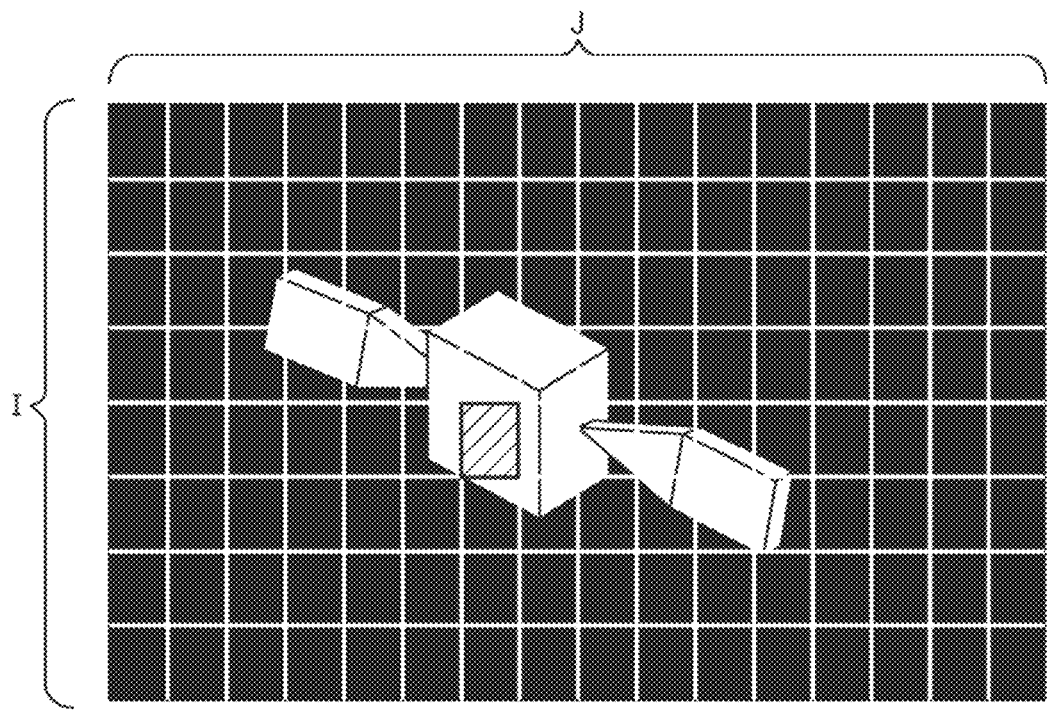
FIG. 3 is an explanatory diagram showing an example of an infrared image taken by an infrared image taking unit 100.
Figure 4:
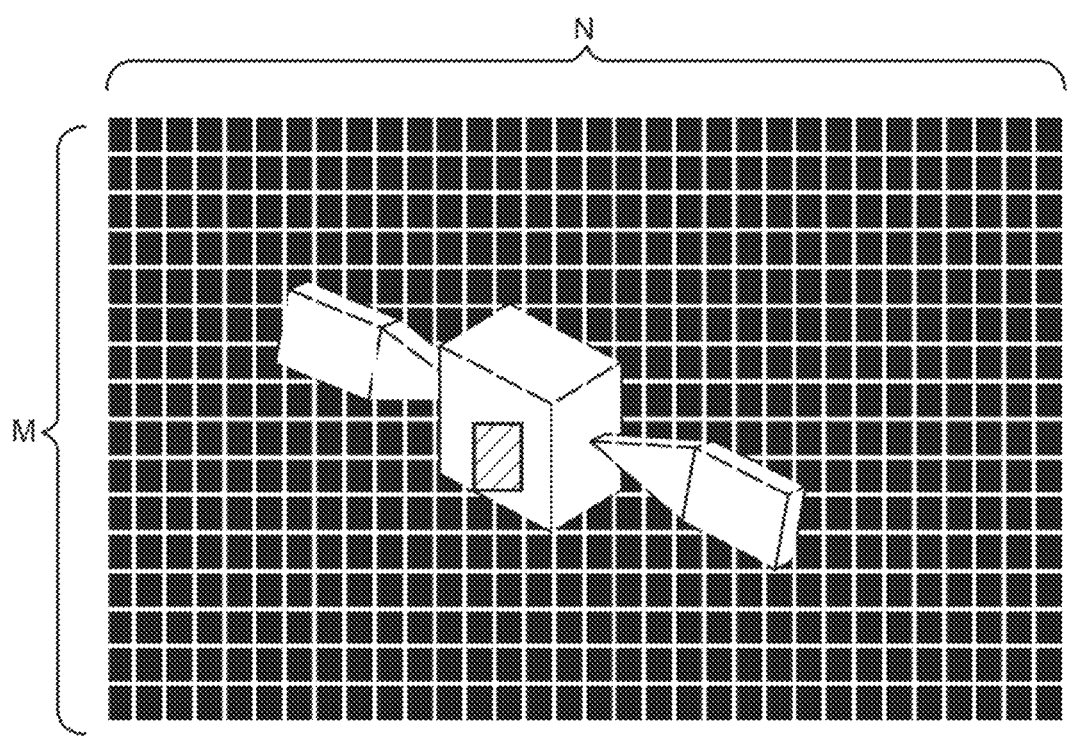
FIG. 4 is an explanatory diagram showing an example of an optical image taken by an optical image taking unit 400.

The following explanation is based on the infrared image shown in FIG. 3 and the optical image shown in FIG. 4. FIG. 3 is an explanatory diagram showing an example of an infrared image taken by an infrared image taking unit 100, and FIG. 4 is an explanatory diagram showing an example of an optical image taken by an optical image taking unit 400.

The infrared image shown in FIG. 3 is output with a resolution of I×J (I and J are positive integers, respectively). In the infrared image shown in FIG. 3, the center coordinates in the pixel with the peak luminance value (the shaded rectangle in FIGS. 3-4) is (i, j), and the corresponding peak luminance value is I(i, j).

In other words, the above center coordinates (i, j) are the coordinates of the pixel with the largest luminance or the pixel with the smallest luminance in the infrared image input from the peak value coordinate computation unit 202. The peak value of luminance includes the largest value of luminance and the smallest value of luminance.

The optical image shown in FIG. 4 is output with a resolution of M×N (M and N are positive integers, respectively). As shown in FIG. 4, if there are multiple pixels in the optical image corresponding to coordinates (i, j), the optical/infrared alignment unit 203 sets the center coordinates of each pixel to (m, n), (m+1, n), (m+2, n), . . . , (m+k, n+k'), . . . , (m, n+1) (k, k' are arbitrary integers, respectively).

Next, the optical/infrared alignment unit 203 sets the coordinates in the optical image which are closest to (i, j) among the center coordinates of each pixel to (m', n'). The optical/infrared alignment unit 203 considers the luminance of the optical image at coordinates (m', n') as I(i, j). In other words, the optical/infrared alignment unit 203 sets the luminance of the optical image at coordinates (m', n') as the largest or smallest luminance data.

The above process allows the optical/infrared alignment unit 203 to associate pixels with peak luminance values in the infrared image with the coordinates of the optical image. The optical/infrared alignment unit 203 inputs the information of the peak luminance values, including the largest and smallest luminance data, represented by the coordinates of the optical image to the peak value 3D coordinate computation unit 204.

The information of the peak luminance values associated with the coordinates of the optical image from the optical/infrared alignment unit 203 and the information of the coordinates on the 3D structure of the target satellite associated with the optical image from the 2D/3D matching unit 503 are input to the peak value 3D coordinate computation unit 204, respectively.

Using the two input information, the peak value 3D coordinate computation unit 204 makes a one-to-one correspondence between the coordinates on the 3D structure of the target satellite and the largest or smallest luminance data. In other words, the peak value 3D coordinate computation unit 204 associates the determined maximum and minimum pixels with coordinates on the 3D structure of the target satellite, respectively, by the peak value coordinate computation unit 202.

The peak value 3D coordinate computation unit 204 inputs the coordinates on the 3D structure and the information of the peak luminance values in a one-to-one correspondence to the normal direction acquisition unit 205.

The normal direction acquisition unit 205 computes the normal vector to the 3D structure based on the coordinates on the 3D structure $(X_p, Y_p, Z_p)$ corresponding to the peak luminance value input from the peak value 3D coordinate computation unit 204 and the 3D model of the target satellite. The normal direction acquisition unit 205 obtains the normal vector n including the coordinates $(X_p, Y_p, Z_p)$ in the 3D model of the target satellite.

Figure 5:
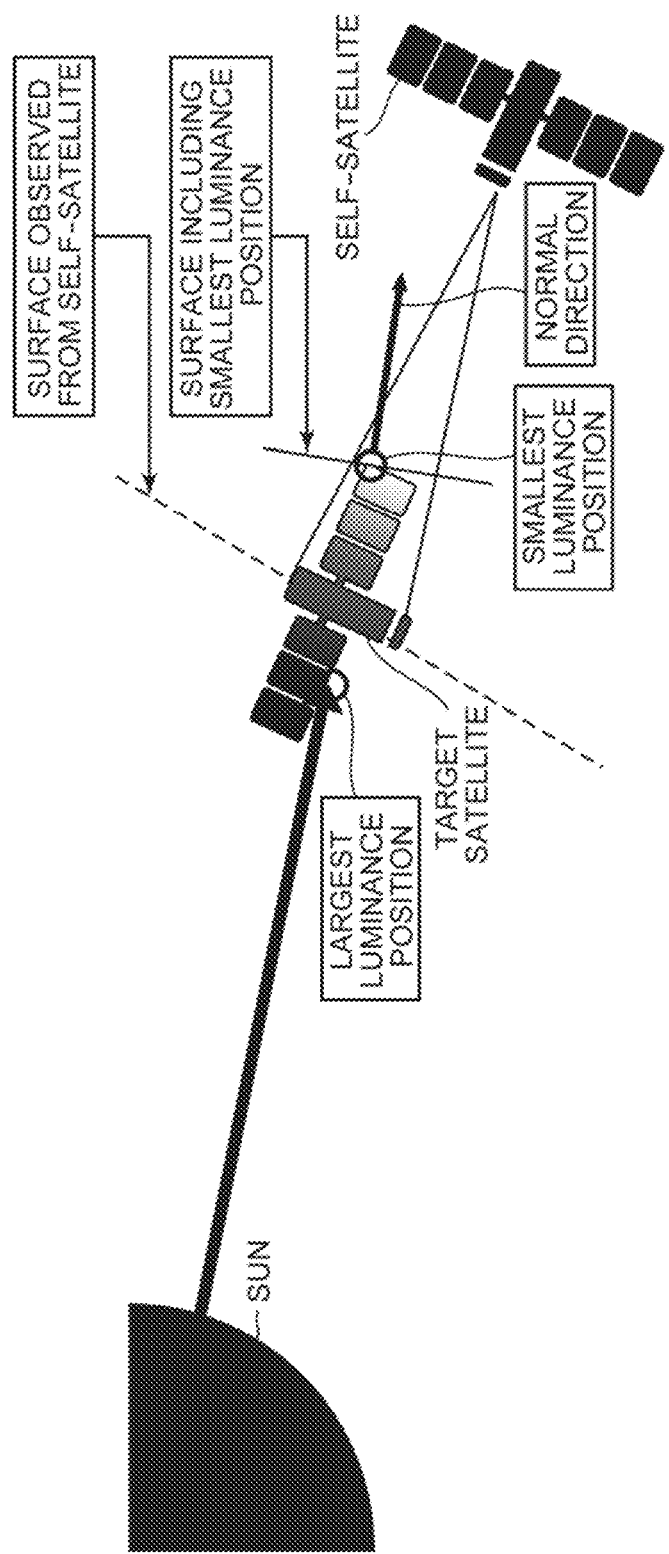
FIG. 5 is an explanatory diagram showing positions corresponding to the peak values of luminance in the target satellite and normal direction.

FIG. 5 is an explanatory diagram showing positions corresponding to the peak values of luminance in the target satellite and normal direction. As shown in FIG. 5, the position where the sunlight directly irradiates becomes the position where the luminance becomes the largest when it is taken. The position on the opposite side of the sun becomes the position where the luminance becomes the smallest when it is taken.

As shown in FIG. 5, the direction perpendicular to the surface including the position where the luminance becomes the smallest is an example of the normal direction indicated by the computed normal vector. The dashed line shown in FIG. 5 represents the surface observed from the self-satellite. Each notation shown in FIG. 5 also has the same meaning in FIGS. 6-7.

In other words, the normal direction acquisition unit 205 computes normal vectors for a surface including the coordinates associated with the pixel, respectively, over the coordinates associated with each pixel, by the peak value 3D coordinate computation unit 204. The normal direction acquisition unit 205 inputs the computed normal vector n, and the coordinates on the 3D structure and the information of the peak luminance values in a one-to-one correspondence to the sun direction estimation unit 206.

The sun direction estimation unit 206 classifies the peak luminance values indicated by the input information of the peak luminance values into the largest value and the smallest value. When the peak value is the largest value, the sun direction estimation unit 206 estimates that the target satellite was irradiated by the sun from the normal direction obtained by the normal direction acquisition unit 205. In other words, the sun direction estimation unit 206 considers the direction of the sun as the direction of the normal vector.

If the peak value is the smallest value, the sun direction estimation unit 206 estimates that the target satellite was irradiated by the sun from the opposite side of the normal direction obtained by the normal direction acquisition unit 205. In other words, the sun direction estimation unit 206 considers the direction of the sun as the direction of the opposite vector of the normal vector.

Figure 6:
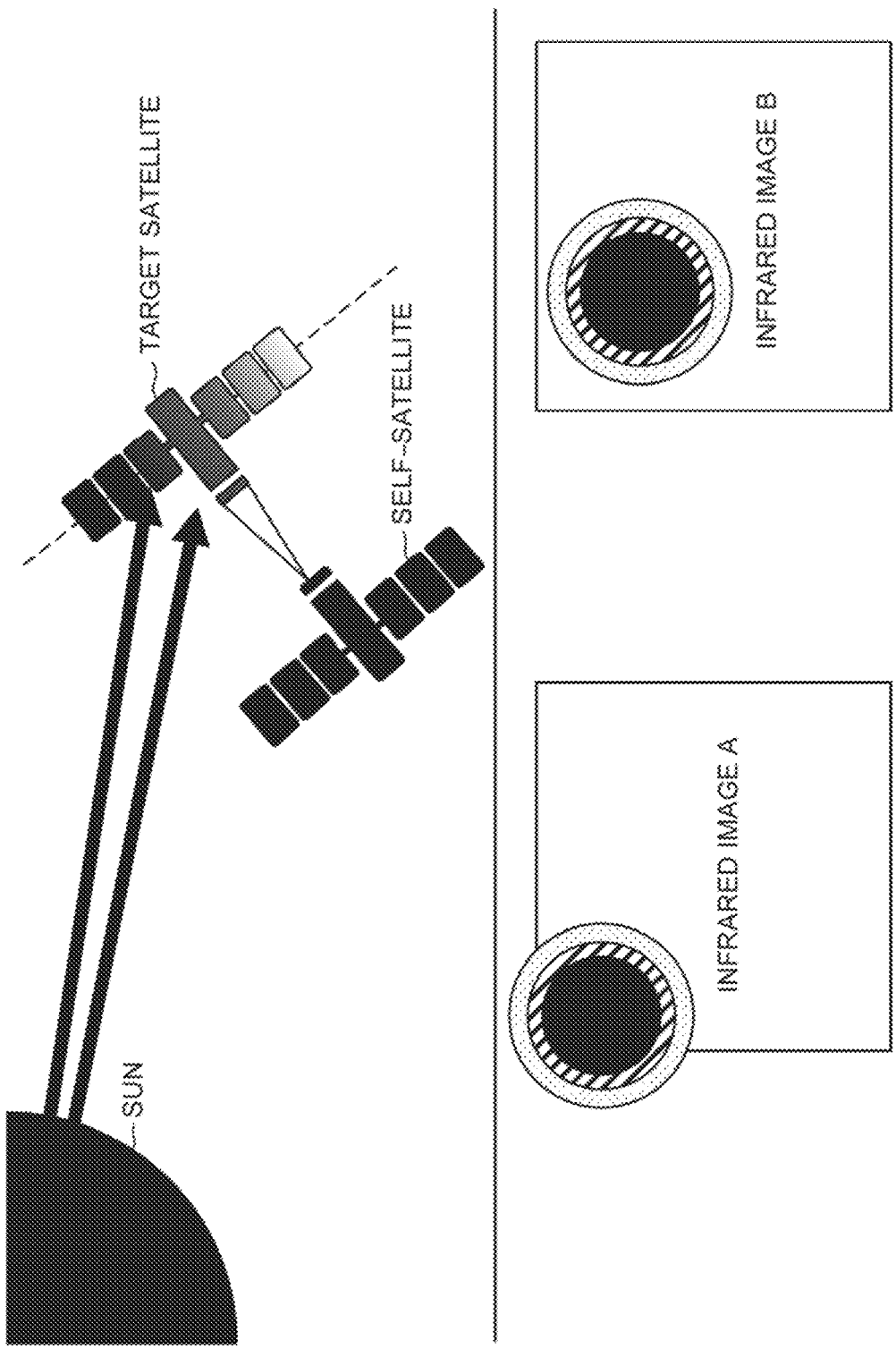
FIG. 6 is an explanatory diagram showing an example of the positional relationship between the sun, the target satellite, and the self-satellite, and an infrared image.

FIG. 6 is an explanatory diagram showing an example of the positional relationship between the sun, the target satellite, and the self-satellite, and an infrared image. When the positional relationship between the sun, the target satellite, and the self-satellite is the relationship as shown in the upper part of FIG. 6, the infrared image as shown in the lower part of FIG. 6 is taken.

The infrared image shown in FIG. 6 is an infrared image of the target satellite taken by a self-satellite. The circles in the infrared image shown in FIG. 6 are pixels with large luminance. In the example shown in FIG. 6, the inner circle corresponds to the pixel with the larger luminance.

The infrared image A shown in FIG. 6 is an infrared image in which some of the positions of the target satellite, whose luminance is the largest when it is taken, are not taken. The infrared image B shown in FIG. 6 is an infrared image in which all the positions of the target satellite, whose luminance is the largest when it is taken, are taken.

If there are coordinates among of coordinates in the 3D structure of the target satellite that has the largest luminance when it is taken, it is estimated that the position of the target satellite indicated by the coordinates was facing the sun at any given time in the past. If the position of the target satellite indicated by the coordinates was facing the sun, the infrared image shown in FIG. 6 will be taken. Therefore, when the infrared image shown in FIG. 6 is taken, the sun direction estimation unit 206 uses the largest luminance value to estimate the past direction of the sun.

Figure 7:
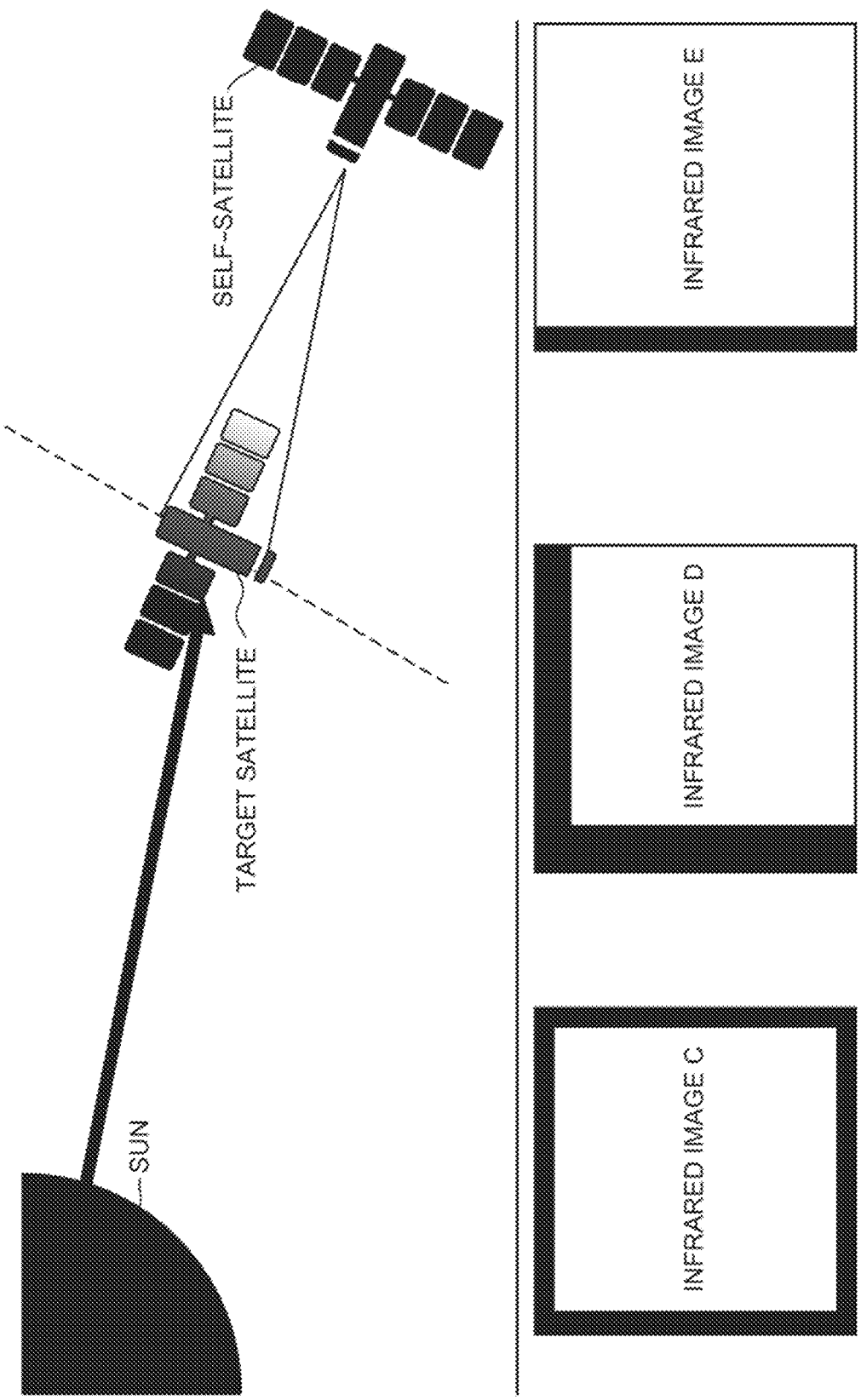
FIG. 7 is an explanatory diagram showing another example of the positional relationship between the sun, the target satellite, and the self-satellite, and an infrared image.

FIG. 7 is an explanatory diagram showing another example of the positional relationship between the sun, the target satellite, and the self-satellite, and an infrared image. When the positional relationship between the sun, the target satellite, and the self-satellite is the relationship as shown in the upper part of FIG. 7, the infrared image as shown in the lower part of FIG. 7 is taken.

The infrared image shown in FIG. 7 is an infrared image of the target satellite taken by a self-satellite. The black areas in the infrared images shown in FIG. 7 are pixels with the largest luminance. In the infrared images C to E shown in FIG. 7, there are multiple pixels with the largest luminance in a linear pattern.

The infrared images C to E shown in FIG. 7 represents that the position of the target satellite, which has the largest luminance when it is taken, exists in a band along the shape of the target satellite. If the position of the target satellite, which has the largest luminance when it is taken, exists in a band along the shape of the target satellite, the sun is considered to be located behind the target satellite as seen from the self-satellite.

In other words, in the example shown in FIG. 7, the position of the target satellite corresponding to the pixel with the largest luminance in the infrared image shown in FIG. 6 is not taken in the infrared image. In the above case, since the position of the target satellite corresponding to the pixel with the smallest luminance in the infrared image can be estimated to be the farthest position from the sun, the sun direction estimation unit 206 estimates the past direction of the sun using the smallest luminance value.

In other words, the sun direction estimation unit 206 estimates the direction of the sun relative to the target satellite before the infrared image is taken using the computed normal vectors by the normal direction acquisition unit 205.

Specifically, the sun direction estimation unit 206 selects whether to use the normal vector for the surface including the coordinates associated with the maximum pixel or the normal vector for the surface including the coordinates associated with the minimum pixel, according to the infrared image.

The sun direction estimation unit 206 estimates the direction of the sun to be the direction indicated by the normal vector for the surface including the coordinates associated with the maximum pixel. The sun direction estimation unit 206 estimates the direction of the sun to be the direction indicated by the inverse vector of the normal vector for the surface including the coordinates associated with the minimum pixel.

The unit vector $Vec_{now}=(x, y, z)$ of the direction of the sun at the time of taking in the predetermined fixed coordinate system (X, Y, Z) obtained from the sun position computation unit 601 and the unit vector $Vec_{old}=(u, v, w)$ of the past direction of the sun obtained from the sun direction estimation unit 206 are input to the sun direction comparison unit 207.

If the angle that $Vec_{now}$ makes with respect to the XZ plane of a predetermined fixed coordinate system is θ and the angle that $Vec_{now}$ makes with respect to the YZ plane is φ, then $Vec_{now}$ is expressed by the following equation.

$$Vec_{now} = \begin{pmatrix} x \\ y \\ z \end{pmatrix} = \begin{pmatrix} \cos\theta\sin\phi \\ \sin\theta \\ \cos\theta\cos\phi \end{pmatrix}$$

If the angle that $Vec_{old}$ makes with respect to the XZ plane of a predetermined fixed coordinate system is θ' and the angle that $Vec_{old}$ makes with respect to the YZ plane is φ', then $Vec_{old}$ is expressed by the following equation.

$$Vec_{old} = \begin{pmatrix} u \\ v \\ w \end{pmatrix} = \begin{pmatrix} \cos\theta'\sin\phi' \\ \sin\theta' \\ \cos\theta'\cos\phi' \end{pmatrix}$$

The sun direction comparison unit 207 computes (θ–θ', φ–φ'), which is the angle difference between $Vec_{now}$ and $Vec_{old}$. Assuming that the position of the sun does not change between the past time point and the time of taking, the computed angle difference between the two unit vectors whose directions are the direction of the sun is the amount of change in the attitude of the target satellite.

In other words, the sun direction comparison unit 207 computes difference between the estimated direction of the sun and the direction of the sun relative to the target satellite at the time the infrared image was taken, which is computed from information about the taking of the target satellite by the infrared sensor. The sun direction comparison unit 207 inputs the angle difference between the two unit vectors whose directions are the direction of the sun to the satellite past attitude estimation unit 208.

The satellite past attitude estimation unit 208 estimates the past attitude information of the target satellite using the angle difference (θ–θ', φ–φ') of the two unit vectors whose directions are the direction of the sun input from the sun direction comparison unit 207, and the attitude information at the time of taking input from the attitude acquisition unit 502.

In other words, the satellite past attitude estimation unit 208 estimates information indicating the attitude of the target satellite before the infrared image is taken by using the difference computed by the sun direction comparison unit 207 and information indicating the attitude of the target satellite at the time the infrared image was taken. The information indicating the attitude of the target satellite at the time the infrared image was taken in this example embodiment is the information obtained from an optical image of the target satellite taken by an optical sensor at the same time as the infrared image.

If such as the material of the target satellite is known and the temperature gradient with respect to time can be computed, the satellite past attitude estimation unit 208 may compute how much past attitude information is the estimated past attitude information of the target satellite based on the luminance at the time of taking and the luminance before taking.

For example, consider the case where the target satellite, whose surface is covered with material A, is taken at time t. For material A, the time constant of temperature change kA, and the luminance value of the infrared image Isun, corresponding to the highest value of the satellite surface temperature during solar irradiation are known.

If the largest luminance in the infrared image of the target satellite taken at time t is Imax and the time when it was irradiated by the sun is t0, respectively, then kA=ΔI/Δt, so the following equation is valid.

$$(Isun - I\max)/(t - t0) = kA \quad \text{Equation (1)}$$

ΔI and Δt represent the difference in luminance and the difference in time, respectively. Isun is a value that depends on the distance between the sun and the target satellite. In addition, Isun is a value that varies at each time of taking. The satellite past attitude estimation unit 208 may use the value of Isun compiled in a database in advance. Equation (1) allows the satellite past attitude estimation unit 208 to compute the time t0 when the satellite was irradiated by the sun.

In other words, the satellite past attitude estimation unit 208 estimates how far in the past the estimated information indicating the attitude using the largest value of luminance in the infrared image is from the time when the image was taken.

The satellite past attitude estimation unit 208 inputs the estimated past attitude information of the target satellite to the attitude output unit 209. The attitude information at the time of taking of the target satellite is also input to the attitude output unit 209 from the attitude acquisition unit 502.

The attitude output unit 209 outputs the two input attitude information to the display unit 300. The user can check the two attitude information displayed by the display unit 300.

For example, if there is a sudden change from the past attitude information of the target satellite to the attitude information at the time of taking, the user can judge that the target satellite may be under attack or emergency taking. The reason for this is that the sudden change that have occurred is considered to be a change in accordance with some purpose different from normal operations. In other words, users can infer the target of monitoring and the purpose of operation of the target satellite by acquiring the attitude information at each point in time.

[Description of Operation]

Figure 8:
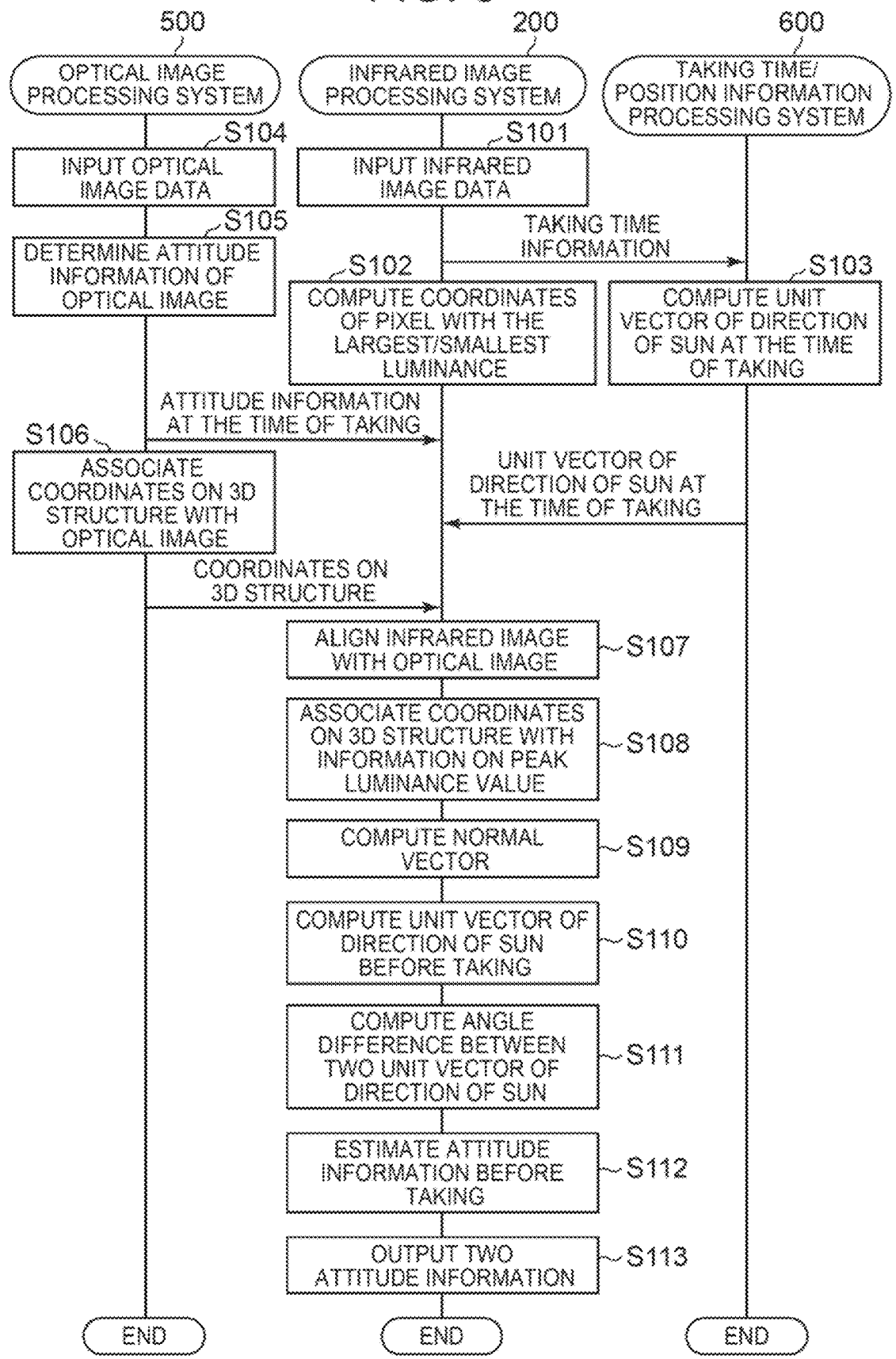
FIG. 8 is a flowchart showing the operation of the satellite attitude estimation processing by the satellite attitude estimation system 1000 of the first example embodiment.

The operation of the satellite attitude estimation system 1000 of this example embodiment will be described below with reference to FIG. 8. FIG. 8 is a flowchart showing the operation of the satellite attitude estimation processing by the satellite attitude estimation system 1000 of the first example embodiment.

First, infrared image data from the infrared image taking unit 100 is input to the infrared image input unit 201 (Step S101). The infrared image input unit 201 inputs the infrared image indicated by the infrared image data to the peak value coordinate computation unit 202, and the taking time information indicated by the infrared image data to the sun position computation unit 601, respectively.

Next, the peak value coordinate computation unit 202 computes the coordinates of the pixel with the largest luminance and the coordinates of the pixel with the smallest luminance in the input infrared image, respectively (Step S102).

The sun position computation unit 601 computes the position of the target satellite and the position of the sun in a predetermined fixed coordinate system based on the taking time information input from the infrared image input unit 201, respectively. Next, the sun position computation unit 601 computes the unit vector of the direction of the sun at the time of taking (Step S103). The sun position computation unit 601 inputs the computed unit vector of the direction of the sun to the sun direction comparison unit 207.

In parallel with the processing in the infrared image processing system 200, optical image data is input to the optical image input unit 501 from the optical image taking unit 400 (Step S104). Next, the optical image input unit 501 inputs the input optical image data to the optical/infrared alignment unit 203, the attitude acquisition unit 502, and the 2D/3D matching unit 503.

Next, the attitude acquisition unit 502 searches the satellite attitude database 700 for the training image that is most similar to the optical image. Next, the attitude acquisition unit 502 determines the attitude parameter associated with the searched training image to be the attitude information at the time of taking (Step S105). The attitude acquisition unit 502 inputs the determined attitude information to the satellite past attitude estimation unit 208 and the attitude output unit 209.

Next, the 2D/3D matching unit 503 matches the optical image with the simulated image stored in the satellite 3D model database 800, respectively, and searches for the simulated image that is most similar to the optical image.

Next, the 2D/3D matching unit 503 associates the coordinates on the 3D structure associated with the searched simulated image with the optical image (Step S106). The 2D/3D matching unit 503 inputs the information of the coordinates on the 3D structure associated with the optical image to the peak value 3D coordinate computation unit 204.

Next, the optical/infrared alignment unit 203 aligns the infrared image with the optical image (Step S107). Specifically, the optical/infrared alignment unit 203 associates the pixels having the peak luminance value in the infrared image with the coordinates of the optical image. The optical/infrared alignment unit 203 inputs the information on the peak luminance values, including the largest and smallest luminance data, represented by the coordinates of the optical image to the peak value 3D coordinate computation unit 204.

Next, the peak value 3D coordinate computation unit 204 associates the coordinates on the 3D structure of the target satellite with the largest or smallest luminance data (Step S108). The peak value 3D coordinate computation unit 204 inputs the associated coordinates on the 3D structure and the information on the peak luminance value to the normal direction acquisition unit 205.

Next, the normal direction acquisition unit 205 computes the normal vector to the 3D structure based on the coordinates on the 3D structure corresponding to the peak luminance values input from the peak value 3D coordinate computation unit 204 and the 3D model of the target satellite (Step S109). The normal direction acquisition unit 205 inputs the computed normal vector and the associated coordinates on the 3D structure and the information on the peak luminance value to the sun direction estimation unit 206.

Next, the sun direction estimation unit 206 computes the unit vector of the direction of the sun before taking based on the normal vector obtained by the normal direction acquisition unit 205 (Step S110). The sun direction estimation unit 206 inputs the unit vector of the direction of the sun before taking to the sun direction comparison unit 207.

Next, the sun direction comparison unit 207 computes the angle difference between the unit vector of the direction of the sun at the time of taking and the unit vector of the direction of the sun before taking (Step S111). The sun direction comparison unit 207 inputs the computed angle difference between the two unit vectors whose directions are the direction of the sun to the satellite past attitude estimation unit 208.

Next, the satellite past attitude estimation unit 208 estimates the attitude information of the target satellite before taking from the angle difference of the two unit vectors whose directions are the direction of the sun and the attitude information at the time of taking input from the sun direction comparison unit 207 (Step S112). The satellite past attitude estimation unit 208 inputs the estimated attitude information of the target satellite before taking to the attitude output unit 209.

Next, the attitude output unit 209 outputs the two input attitude information to the display unit 300 (Step S113). After the output, the satellite attitude estimation system 1000 ends the satellite attitude estimation processing.

[Description of Effects]

The peak value coordinate computation unit 202 of the satellite attitude estimation system 1000 of this example embodiment computes the coordinates of the pixels with the largest luminance, and the coordinates of the pixels with the smallest luminance respectively, based on the luminance obtained from the acquired infrared image.

Next, the sun direction estimation unit 206 computes the direction of the sun before taking using the coordinates on the 3D structure of the target satellite input from the optical image processing system 500. In addition, the sun direction comparison unit 207 and the satellite past attitude estimation unit 208 compare the direction of the sun at the time of taking with the computed direction of the sun to estimate the attitude information of the target satellite before taking. Through the above process, the satellite attitude estimation system 1000 can estimate the attitude of the satellite before taking from the images taken of the satellite.

The satellite attitude estimation system 1000 of this example embodiment can acquire more accurate attitude information of the target satellite before taking by using an infrared camera together with an optical camera. The reason for this is that infrared images have a low resolution, and if infrared images alone are used, errors are likely to occur in the estimated attitude of the target satellite.

When infrared images and optical images are used together, the attitude of the target satellite can be estimated from the optical images, and the hottest surface among of surfaces of the target satellite can be estimated from the infrared images. Since it is estimated that the sun was located in the normal direction of the hottest surface, the satellite attitude estimation system 1000 can estimate the attitude of the target satellite before taking.

Example Embodiment 2

[Description of Configuration]

Figure 9:
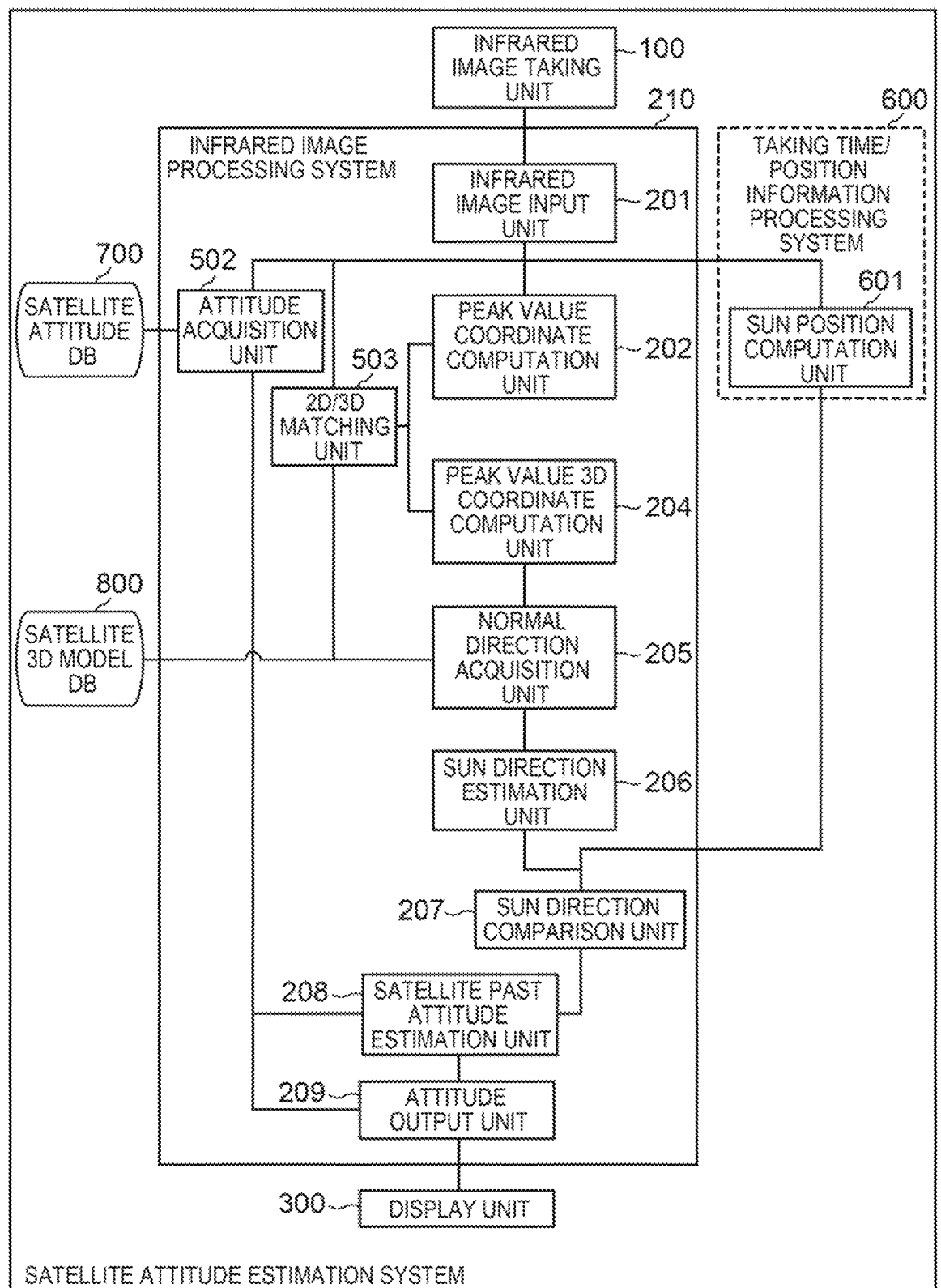
FIG. 9 is a block diagram showing an example of the configuration of a satellite attitude estimation system of the second example embodiment of the present invention.

Next, the second example embodiment of the present invention will be described with reference to the drawings. FIG. 9 is a block diagram showing an example of the configuration of a satellite attitude estimation system of the second example embodiment of the present invention. The functions of the components with the same sign as in the first example embodiment are the same as those in the first example embodiment.

As shown in FIG. 9, the satellite attitude estimation system 1001 includes an infrared image processing system 210, and a taking time/position information processing system 600. Unlike the first example embodiment, the satellite attitude estimation system 1001 of this example embodiment does not include the optical image processing system 500.

As shown in FIG. 9, the infrared image processing system 210 has an infrared image input unit 201, a peak value coordinate computation unit 202, a peak value 3D coordinate computation unit 204, a normal direction acquisition unit 205, a sun direction estimation unit 206, a sun direction comparison unit 207, a satellite past attitude estimation unit 208, an attitude output unit 209, an attitude acquisition unit 502, and a 2D/3D matching unit 503.

As shown in FIG. 9, the infrared image processing system 210 is connected to the infrared image taking unit 100 for communication. In addition, as shown in FIG. 9, the infrared image input unit 201 and the sun direction comparison unit 207 are connected to the taking time/position information processing system 600, which is an external system of the infrared image processing system 210 for communication. In addition, as shown in FIG. 9, a satellite attitude database 700 and a satellite 3D model database 800 are connected to the infrared image processing system 210 for communication.

In other words, unlike the first example embodiment, the infrared image processing system 210 of this example embodiment has an attitude acquisition unit 502 and a 2D/3D matching unit 503, and does not have an optical/infrared alignment unit 203.

The satellite attitude estimation system 1000 of the first example embodiment estimated the past attitude of the target satellite using the optical image processing system 500 and the infrared image processing system 200. The satellite attitude estimation system 1001 of this example embodiment acquires the attitude information at the time of taking and performs 2D/3D matching, which was done using optical images in the first example embodiment, using only infrared images.

[Description of Operation]

Figure 10:
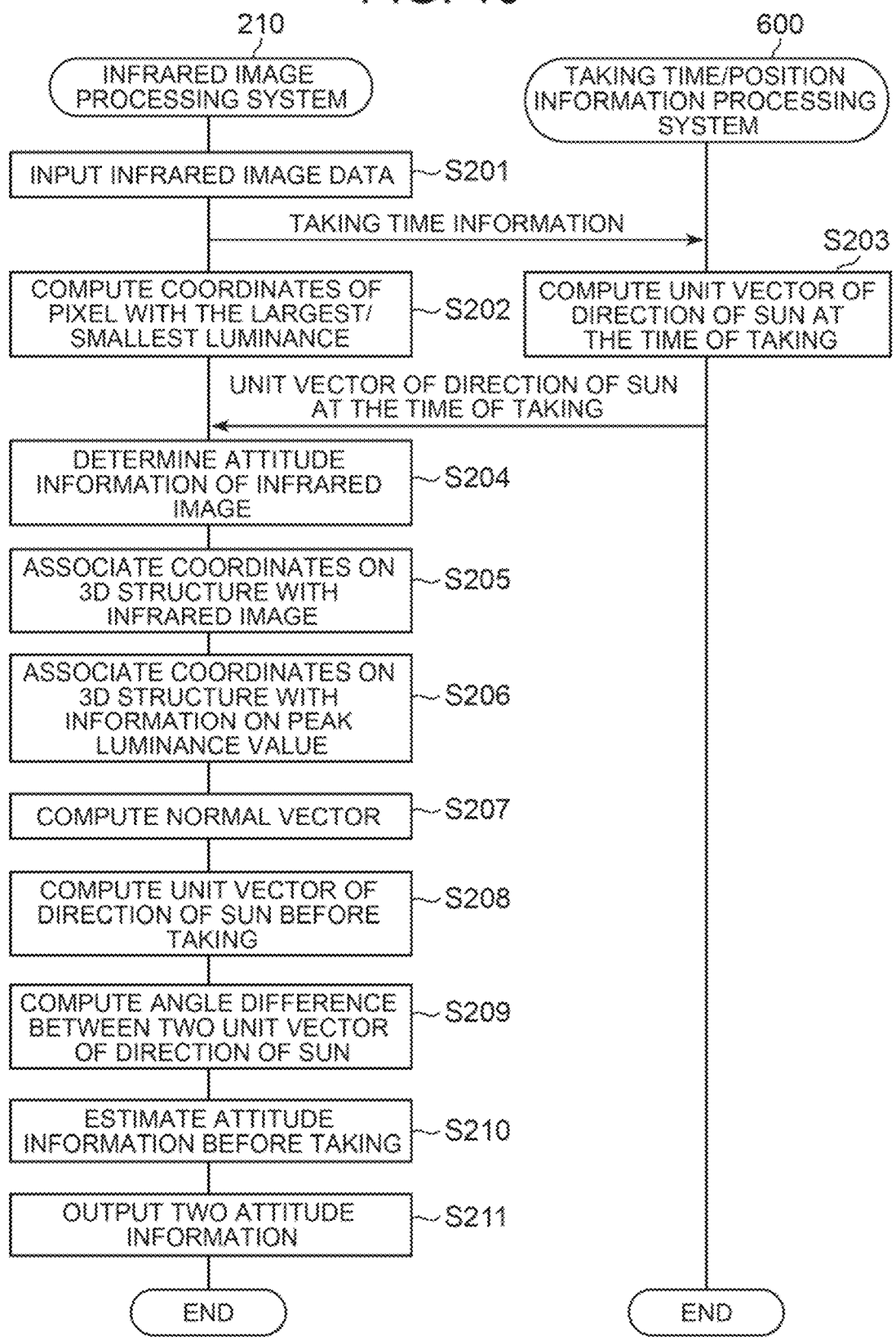
FIG. 10 is a flowchart showing the operation of the satellite attitude estimation processing by the satellite attitude estimation system 1001 of the second example embodiment.

The operation of the satellite attitude estimation system 1001 of this example embodiment will be described below with reference to FIG. 10. FIG. 10 is a flowchart showing the operation of the satellite attitude estimation processing by the satellite attitude estimation system 1001 of the second example embodiment.

Each of the processes in Steps S201 through S203 is the same as each of the processes in Steps S101 through S103 shown in FIG. 8.

Next, the attitude acquisition unit 502 searches for the training image that is most similar to the infrared image from the satellite attitude database 700. Next, the attitude acquisition unit 502 determines the attitude parameter associated with the searched training image to be the attitude information at the time of taking (Step S204). The attitude acquisition unit 502 inputs the determined attitude information to the satellite past attitude estimation unit 208 and the attitude output unit 209.

Next, the 2D/3D matching unit 503 matches the infrared image with the simulated image stored in the satellite 3D model database 800, respectively, and searches for the simulated image that is most similar to the infrared image.

Next, the 2D/3D matching unit 503 associates the coordinates on the 3D structure associated with the searched simulated image with the infrared image (Step S205). The 2D/3D matching unit 503 inputs the information of the coordinates on the 3D structure associated with the infrared image to the peak value 3D coordinate computation unit 204.

Each of the processes in Steps S206 through S211 is the same as each of the processes in Steps S108 through S113 shown in FIG. 8.

[Description of Effects]

Unlike the first example embodiment, the infrared image processing system 210 of the satellite attitude estimation system 1001 of this example embodiment estimates the past attitude of the target satellite using only the infrared images taken of the target satellite. Therefore, the satellite attitude estimation system 1001 can estimate the past attitude of the target satellite faster than the first example embodiment. Also, the satellite attitude estimation system 1001 can reduce the cost of processing optical images.

The satellite attitude estimation system 1000-1001 of each example embodiment may be used, for example, in the fields of object detection, satellites, or attitude detection.

It is assumed that the satellite attitude estimation system 1000-1001 of each example embodiment are used, for example, in a self-satellite system and a ground system that receives data from a self-satellite and manages the received data. The satellite attitude estimation system 1000-1001 may be used in the self-satellite.

Figure 11:
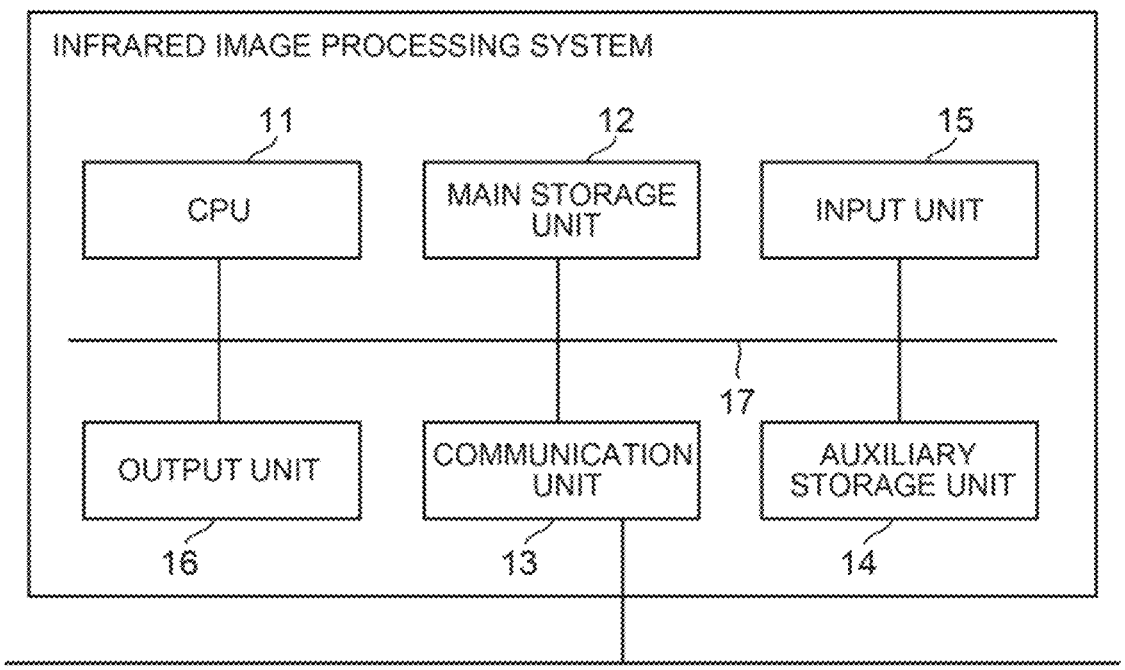
FIG. 11 is an explanatory diagram showing an example of a hardware configuration of the infrared image processing system according to the present invention.

A specific example of a hardware configuration of the infrared image processing system 200-210 according to each example embodiment will be described below. FIG. 11 is an explanatory diagram showing an example of a hardware configuration of the infrared image processing system according to the present invention.

The infrared image processing system shown in FIG. 11 includes a CPU (Central Processing Unit) 11, a main storage unit 12, a communication unit 13, and an auxiliary storage unit 14. The infrared image processing system also includes an input unit 15 for the user to operate and an output unit 16 for presenting a processing result or a progress of the processing contents to the user.

The infrared image processing system is realized by software, with the CPU 11 shown in FIG. 11 executing a program that provides a function that each component has.

Specifically, each function is realized by software as the CPU 11 loads the program stored in the auxiliary storage unit 14 into the main storage unit 12 and executes it to control the operation of the infrared image processing system.

The infrared image processing system shown in FIG. 11 may include a DSP (Digital Signal Processor) instead of the CPU 11. Alternatively, the infrared image processing system shown in FIG. 11 may include both the CPU 11 and the DSP.

The main storage unit 12 is used as a work area for data and a temporary save area for data. The main storage unit 12 is, for example, RAM.

The communication unit 13 has a function of inputting and outputting data to and from peripheral devices through a wired network or a wireless network (information communication network).

The auxiliary storage unit 14 is a non-transitory tangible medium. Examples of non-transitory tangible media are, for example, a magnetic disk, an optical magnetic disk, a CD-ROM (Compact Disk Read Only Memory), a DVD-ROM (Digital Versatile Disk Read Only Memory), a semiconductor memory.

The input unit 15 has a function of inputting data and processing instructions. The input unit 15 is, for example, an input device such as a keyboard or a mouse.

The output unit 16 has a function to output data. The output unit 16 is, for example, a display device such as a liquid crystal display device, or a printing device such as a printer.

As shown in FIG. 11, in the infrared image processing system, each component is connected to the system bus 17.

The auxiliary storage unit 14 stores programs for realizing the infrared image input unit 201, the peak value coordinate computation unit 202, the optical/infrared alignment unit 203, the peak value 3D coordinate computation unit 204, the normal direction acquisition unit 205, the sun direction estimation unit 206, the sun direction comparison unit 207, the satellite past attitude estimation unit 208, and the attitude output unit 209 in the infrared image processing system 200 of the first example embodiment.

The infrared image processing system 200 may be implemented with a circuit that contains hardware components inside such as an LSI (Large Scale Integration) that realize the functions shown in FIG. 2, for example.

The auxiliary storage unit 14 stores programs for realizing the infrared image input unit 201, the peak value coordinate computation unit 202, the peak value 3D coordinate computation unit 204, the normal direction acquisition unit 205, the sun direction estimation unit 206, the sun direction comparison unit 207, the satellite past attitude estimation unit 208, the attitude output unit 209, the attitude acquisition unit 502, and the 2D/3D matching unit 503 in the infrared image processing system 210 of the second example embodiment.

The infrared image processing system 210 may be implemented with a circuit that contains hardware components inside such as an LSI that realize the functions shown in FIG. 9, for example.

The infrared image processing system 200-210 may be realized by hardware that does not include computer functions using elements such as a CPU. For example, some or all of the components may be realized by a general-purpose circuit (circuitry) or a dedicated circuit, a processor, or a combination of these. They may be configured by a single chip (for example, the LSI described above) or by multiple chips connected via a bus. Some or all of the components may be realized by a combination of the above-mentioned circuit, etc. and a program.

Some or all of each component of the infrared image processing system 200-210 may be composed of one or more information processing devices equipped with an arithmetic unit and a storage unit.

In the case where some or all of the components are realized by a plurality of information processing devices, circuits, or the like, the plurality of information processing devices, circuits, or the like may be centrally located or distributed. For example, the information processing devices, circuits, etc. may be realized as a client-server system, a cloud computing system, etc., each of which is connected via a communication network.

Figure 12:
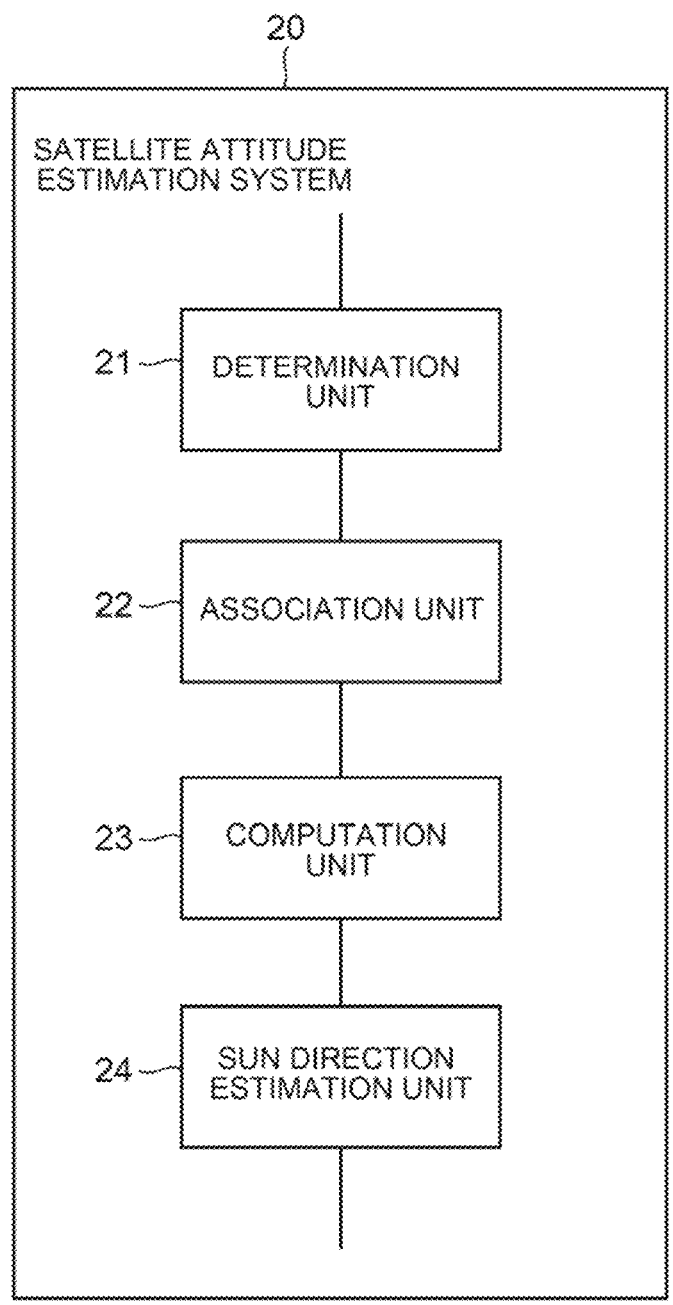
FIG. 12 is a block diagram showing an overview of a satellite attitude estimation system according to the present invention.

Next, an overview of the present invention will be explained. FIG. 12 is a block diagram showing an overview of a satellite attitude estimation system according to the present invention. The satellite attitude estimation system 20 according to the present invention includes a determination unit 21 (for example, the peak value coordinate computation unit 202) which determines the maximum pixel, which is a pixel with the largest luminance, and the minimum pixel, which is a pixel with the smallest luminance, respectively, in an infrared image, which is an image taken by an infrared sensor of a target satellite that is a satellite whose attitude is to be estimated, an association unit 22 (for example, the peak value 3D coordinate computation unit 204) which associates the determined maximum and minimum pixels with coordinates on the 3D structure of the target satellite, respectively, a computation unit 23 (for example, the normal direction acquisition unit 205) which computes normal vectors for a surface including the coordinates associated with the pixel, respectively, over the coordinates associated with each pixel, and a sun direction estimation unit 24 (for example, the sun direction estimation unit 206) which estimates the direction of the sun relative to the target satellite before the infrared image is taken using the computed normal vectors.

With such a configuration, the satellite attitude estimation system can estimate the attitude of a satellite before the satellite was taken from the taken images.

The sun direction estimation unit 24 may select whether to use the normal vector for the surface including the coordinates associated with the maximum pixel or the normal vector for the surface including the coordinates associated with the minimum pixel, according to the infrared image.

With such a configuration, the satellite attitude estimation system can estimate the attitude of a satellite before the satellite was taken based on the displayed contents of the infrared image.

The sun direction estimation unit 24 may estimate the direction of the sun to be the direction indicated by the normal vector for the surface including the coordinates associated with the maximum pixel.

With such a configuration, the satellite attitude estimation system can estimate the direction of the sun based on infrared images in which the position of the target satellite, whose luminance is the largest when it is taken, is taken.

The sun direction estimation unit 24 may estimate the direction of the sun to be the direction indicated by the inverse vector of the normal vector for the surface including the coordinates associated with the minimum pixel.

With such a configuration, the satellite attitude estimation system can estimate the direction of the sun based on infrared images in which multiple pixels with largest luminance exist in a linear pattern.

The satellite attitude estimation system 20 may further comprises a difference computation unit (for example, the sun direction comparison unit 207) which computes difference between the estimated direction of the sun and the direction of the sun relative to the target satellite at the time the infrared image was taken, which is computed from information about the taking of the target satellite by the infrared sensor.

With such a configuration, the satellite attitude estimation system can determine the degree of change in the direction of the sun with respect to the target satellite.

The satellite attitude estimation system 20 may further comprises an attitude estimation unit (for example, the satellite past attitude estimation unit 208) which estimates information indicating the attitude of the target satellite before the infrared image is taken by using the computed difference and information indicating the attitude of the target satellite at the time the infrared image was taken.

With such a configuration, the satellite attitude estimation system can estimate the attitude of a target satellite before the target satellite was taken.

The information indicating the attitude of the target satellite at the time the infrared image was taken may be the information obtained from an optical image of the target satellite taken by an optical sensor at the same time as the infrared image.

With such a configuration, the satellite attitude estimation system can more accurately estimate the attitude of a target satellite before the target satellite was taken.

The attitude estimation unit may estimate how far in the past the estimated information indicating the attitude using the largest value of luminance in the infrared image is from the time when the image was taken.

With such a configuration, the satellite attitude estimation system can estimate how far in the past the estimated attitude of the target satellite before the target satellite was taken.

It is thought that an attitude of a satellite in space can be estimated by taking it with an optical camera and using a method similar to that described in Japanese Patent No. 6188345. However, the method for estimating an attitude of a satellite before it is directly taken by an optical camera is not described in Japanese Patent No. 6188345.

The attitude information of the target satellite acquired from the optical image of the target satellite taken by the optical camera includes only the information of the time when the optical image was taken. Therefore, if only the above method is used, the attitude information of the target satellite before the optical image was taken is not acquired, and the information used for monitoring is limited. The method to acquire the attitude information of the target satellite before the optical image was taken is not described in Japanese Patent No. 3697433.

According to this invention, it is possible to estimate the attitude of a satellite before the satellite was taken from the taken images.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

What is claimed is:

1. A satellite attitude estimation system comprising:
    an infrared sensor configured to capture an infrared image of a target satellite for which an attitude is to be estimated;
    a memory storing software instructions; and
    one or more processors configured to execute the software instructions to:
    determine, in the captured infrared image, a first pixel having a largest luminance and a second pixel having a smallest luminance in the infrared image;
    associate the first pixels with first coordinates of a 3D structure of the target satellite;
    associate the second pixels with second coordinates of the 3D structure of the target satellite;
    compute a first normal vector to a surface of the 3D structure for the first coordinates;
    compute a second normal vector to the surface of the 3D structure for the second coordinates; and
    estimate a direction of the target satellite to the sun before the infrared image was taken, using the computed first and second normal vectors.

2. The satellite attitude estimation system according to claim 1, wherein
    the one or more processors are configured to execute the software instructions to further select whether to use the first normal vector or the second normal vector, according to the infrared image.

3. The satellite attitude estimation system according to claim 2, wherein
    the one or more processors are configured to execute the software instructions to further consider a direction indicated by the first normal vector as the direction of the target satellite to the sun.

4. The satellite attitude estimation system according to claim 2, wherein
    the one or more processors are configured to execute the software instructions to further consider a direction indicated by an inverse vector of the second normal vector as the direction of the target satellite to the sun.

5. The satellite attitude estimation system according to claim 1, wherein
    the one or more processors are configured to execute the software instructions to further compute a difference between the estimated direction of the target satellite to the sun and a direction of the target satellite to the sun at a time computed from information on capturing the infrared image.

6. The satellite attitude estimation system according to claim 5, wherein
    the one or more processors are configured to execute the software instructions to further estimate information indicating the attitude of the target satellite before the infrared image is captured by using the computed difference and information indicating the attitude of the target satellite at a time the infrared image was captured.

7. The satellite attitude estimation system according to claim 6, wherein
    the information indicating the attitude of the target satellite at the time the infrared image was captured is obtained from an optical image of the target satellite captured by an optical sensor at a same time as the infrared image.

8. The satellite attitude estimation system according to claim 6, wherein
    the one or more processors are configured to execute the software instructions to further estimate how far in the past the estimated information indicating the attitude is from the time the infrared image was captured, using a largest value of luminance in the infrared image.

9. A satellite attitude estimation method performed by a computer and comprising:
- receiving an infrared image of a target satellite for which an attitude is to be estimated, from an infrared sensor that captured the infrared image;
- determining, in the captured infrared image, a first pixel having a largest luminance and a second pixel having a smallest luminance in the infrared image;
- associating the first pixels with first coordinates of a 3D structure of the target satellite;
- associating the second pixels with second coordinates of the 3D structure of the target satellite;
- computing a first normal vector to a surface of the 3D structure for the first coordinates;
- computing a second normal vector to the surface of the 3D structure for the second coordinates; and
- estimating a direction of the target satellite to the sun before the infrared image was taken, using the computed first and second normal vectors.

10. A non-transitory computer-readable recording medium storing a satellite attitude estimation program executable by a computer to perform processing comprising:
- receiving an infrared image of a target satellite for which an attitude is to be estimated, from an infrared sensor that captured the infrared image;
- determining, in the captured infrared image, a first pixel having a largest luminance and a second pixel having a smallest luminance in the infrared image;
- associating the first pixels with first coordinates of a 3D structure of the target satellite;
- associating the second pixels with second coordinates of the 3D structure of the target satellite;
- computing a first normal vector to a surface of the 3D structure for the first coordinates;
- computing a second normal vector to the surface of the 3D structure for the second coordinates; and
- estimating a direction of the target satellite to the sun before the infrared image was taken, using the computed first and second normal vectors.

11. The satellite attitude estimation system according to claim 2, wherein
the one or more processors are configured to execute the software instructions to further compute a difference between the estimated direction of the target satellite to the sun and a direction of the target satellite to the sun at a time computed from information on capturing the infrared image.

12. The satellite attitude estimation system according to claim 3, wherein
the one or more processors are configured to execute the software instructions to further compute a difference between the estimated direction of the target satellite to the sun and a direction of the target satellite to the sun at a time computed from information on capturing the infrared image.

13. The satellite attitude estimation system according to claim 4, wherein
compute a difference between the estimated direction of the target satellite to the sun and a direction of the target satellite to the sun at a time computed from information on capturing the infrared image.

14. The satellite attitude estimation system according to claim 11, wherein
the one or more processors are configured to execute the software instructions to further estimate information indicating the attitude of the target satellite before the infrared image is captured by using the computed difference and information indicating the attitude of the target satellite at a time the infrared image was captured.

15. The satellite attitude estimation system according to claim 12, wherein
the one or more processors are configured to execute the software instructions to further estimate information indicating the attitude of the target satellite before the infrared image is captured by using the computed difference and information indicating the attitude of the target satellite at a time the infrared image was captured.

16. The satellite attitude estimation system according to claim 13, wherein
the one or more processors are configured to execute the software instructions to further estimate information indicating the attitude of the target satellite before the infrared image is captured by using the computed difference and information indicating the attitude of the target satellite at a time the infrared image was captured.

17. The satellite attitude estimation system according to claim 14, wherein
the information indicating the attitude of the target satellite at the time the infrared image was captured is obtained from an optical image of the target satellite captured by an optical sensor at a same time as the infrared image.

18. The satellite attitude estimation system according to claim 15, wherein
the information indicating the attitude of the target satellite at the time the infrared image was captured is obtained from an optical image of the target satellite captured by an optical sensor at a same time as the infrared image.

19. The satellite attitude estimation system according to claim 16, wherein
the information indicating the attitude of the target satellite at the time the infrared image was captured is obtained from an optical image of the target satellite captured by an optical sensor at a same time as the infrared image.

20. The satellite attitude estimation system according to claim 7, wherein
the one or more processors are configured to execute the software instructions to estimate how far in the past the estimated information indicating the attitude is from the time the infrared image was captured, using a largest value of luminance in the infrared image.

* * * * *